United States Patent [19]

Swift

[11] 3,888,589

[45] June 10, 1975

[54] REFLECTION GRATING OPTICAL ODOMETER

[75] Inventor: David William Swift, Prestatyn, Wales

[73] Assignee: Pilkington P-E Limited, Flintshire, Wales

[22] Filed: Feb. 11, 1974

[21] Appl. No.: 441,473

[52] U.S. Cl. .............. 356/28; 250/237 G; 350/292; 350/299
[51] Int. Cl.[2] ...................... G01P 3/36; G02B 5/08
[58] Field of Search .......... 356/28, 169; 350/162 R, 350/292, 299; 250/237 G

[56] References Cited
UNITED STATES PATENTS

| 3,778,158 | 12/1973 | Erickson | 356/28 |
|---|---|---|---|
| 3,781,110 | 12/1973 | Leitz et al. | 356/4 |
| 3,799,671 | 3/1974 | Schweizer | 356/28 |
| 3,820,896 | 6/1974 | Stavis | 356/28 |

FOREIGN PATENTS OR APPLICATIONS

| 1,249,302 | 10/1971 | United Kingdom | 356/28 |
| 402,427 | 5/1966 | Germany | 250/237 G |

*Primary Examiner*—Malcolm F. Hubler
*Assistant Examiner*—S. C. Buczinski
*Attorney, Agent, or Firm*—John K. Conant

[57] ABSTRACT

An optical system for measuring relative displacement or velocity relative to a surface has grating and light directing means to receive incident light from the surface and direct the light in two different directions to photodetectors which respectively produce signals proportional to the intensity of the light received. The signals from the photodetectors are applied to a differential amplifier which produces an output signal representing the difference between the photodetector signals and which thus has a frequency representing the speed or movement of the system relative to the surface. This output signal may then be applied to known frequency counting devices for indicating velocity or distance travelled from a zero position.

6 Claims, 7 Drawing Figures

REFLECTION GRATING OPTICAL ODOMETER

BACKGROUND OF THE INVENTION

This invention concerns improvements in or relating to optical systems for measuring relative displacement or velocity and more particularly optical systems suitable for use as odometers or speedometers.

Background prior art is found in the following patents:

U.S. Pat. Nos.: 2,016,036; 2,413,349; 3,336,480; 3,511,569; 3,677,647; United Kingdom Patent Nos. 1,118,879; 1,123,950; 1,144,488; French Patent No. 2,143,950.

BRIEF SUMMARY OF THE INVENTION

According to the present invention there is provided apparatus for measuring displacement or velocity relative to a surface, e.g. the ground, above which the apparatus is independently supported, as in a vehicle moving over the ground, for example. The apparatus comprises generally grating and light directing means having bands arranged in alternation and adapted to deviate incident light received from the surface so as to direct it in two different general directions, thereby to provide separate light signals representative of luminous intensity variations of the surface relative to which the grating and light directing means travels, and means effective to compare said separate light signals and to provide an output signal derived from the difference therebetween.

The apparatus preferably comprises first and second photodetector means at spaced positions so that one photodetector means receives light directed in one of said directions while the other photodetector means receives light directed in the other of said directions, and is preferably arranged to focus or collect the directed light on to the respective photodetector means.

The photodetector means are preferably adapted to emit electrical signals representative of the received light signals, the apparatus including means to compare the respective electrical signals and to produce an electrical output signal that is representative of the displacement of the grating and light directing means relative to the surface.

In one embodiment, the grating and light directing means may comprise reflective bands disposed to reflect incident light in two different directions and arranged in alternation. The reflective bands may themselves be adapted to focus or collect the light at respective spaced positions where the photodetector means are located. In this embodiment the grating and light directing means suitably comprises a first series of spaced concave reflective bands having a common centre of curvature, and a second series of spaced concave reflective bands interposed between the bands of the first series and having a common centre of curvature spaced from the centre of curvature of the first series. Also, in this embodiment the photodetectors are in the focal plane of the light collector, and form the system stop. The system is thus telecentric.

In another embodiment, the grating and light directing means comprise a grating having reflective and transmissive bands arranged in alternation and backed by a mirror, the grating and the mirror being relatively inclined so that light reflected by the reflective bands of the grating is directed in a first general direction and light transmitted through the transmissive bands of the grating is reflected by the mirror backing the grating to direct the light (eg. back through the transmissive bands of the grating) in a second general direction. A lens may be disposed in front of the grating so that the light directed in said two general directions is focussed or collected by the lens onto respective photodetector means. The apparatus may also include an aperture and an objective lens which focusses or collects light from the surface on to the aperture.

Although in the foregoing embodiments light from the surface is deviated by reflection to direct it in said two different general directions, the invention is not limited to such an arrangement. Alternatively, for example, the grating and light directing means may be adapted to deviated light by refraction (e.g. may comprise wedge-shaped bands tapering in opposite directions and arranged in alternation) so that light from the surface transmitted through the grating and light directing means is directed in two different general directions.

DESCRIPTION OF THE DRAWINGS

Apparatus in accordance with the invention will now be described by way of example with reference to the accompanying drawings in which.

DETAILED DESCRIPTION OF THE INVENTION

Figure 1:
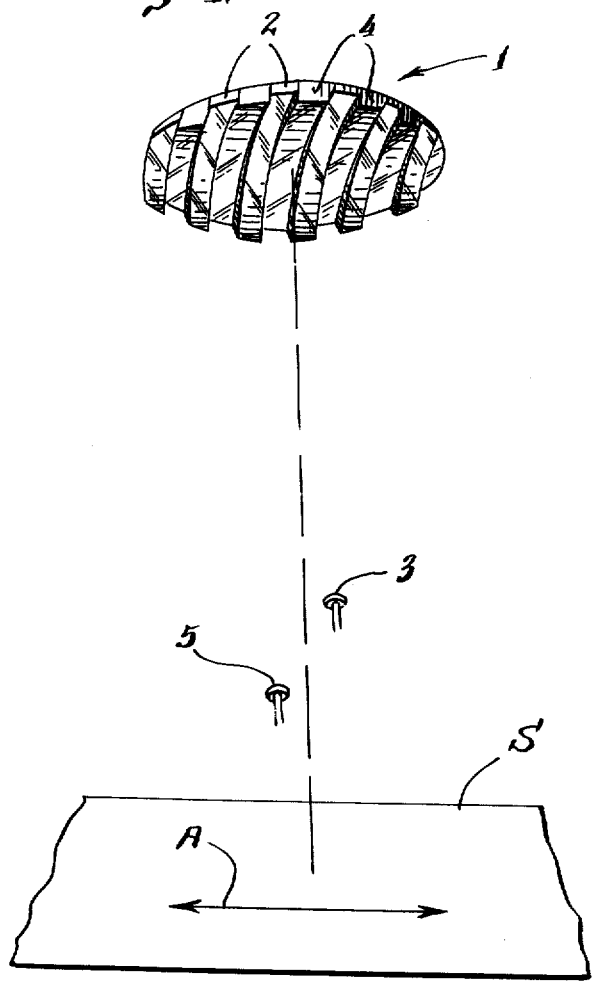
FIG. 1 is a schematic representation of one embodiment.

FIG. 1 shows an optical system which travels relative to a surface S (or relative to which the surface travels) in a direction indicated by the arrow A and which is used to measure displacement relative to that surface, e.g. to measure distance travelled or velocity. The system may, for example, be mounted on a vehicle so that it travels over the ground (e.g. to provide an odometer or a speedometer) and is described below in that mode.

The system comprises a reflective grating arrangement generally indicated as 1 which is made up of concave reflecting bands 2 and 4 arranged in alternation to reflect light in two different directions. Thus alternate bands 2 of the series are so angled as to focus or collect light reflected by those bands at a first position, while the other bands 4 (interposed between bands 2) are so angled as to focus or collect light reflected by those bands at a second position spaced from said first position. Photodetectors in the form of photodiodes 3 and 5 are arranged one at each of said first and second positions. Thus the concave bands 2 are oriented to focus or collect the light reflected therefrom on to the photodiode 3, and alternate bands 4 are oriented to focus or collect light reflected therefrom on to the photodiode 5. The series of spaced concave bands 2 in fact are disposed to have a common centre of curvature and the series of spaced concave bands 4 are also disposed to have a common centre of curvature spaced from that of the series of bands 2.

As will be apparent from FIG. 1, the bands 2 and 4 are essentially perpendicular to the direction of travel of the system relative to the ground. The ground has under virtually all practical circumstances a non-uniform luminous intensity. Light from the ground is received by the grating and light directing means and reflected thereby on to the photodetectors.

Thus as the system travels relative to the ground the light signals received, and hence the electrical signals emitted, by the photodiodes 3 and 5 will be representative of variations in the luminous intensity of the ground. These signals will include a frequency component indicative of speed or movement.

If the system travels relative to the ground at velocity $v$, then each bright point of the ground effectively moves across the grating arrangement 1 with a velocity $vm$ where $m$ is the optical magnification (which may be unity) between the ground and the grating. If the spacial frequency of the grating is $g$ cycles per unit length, this will result in a signal of frequency $f = vmg$ cycles per unit time from each of the photodiodes 3 and 5. Thus, the distance travelled from a given time zero is $$\int_o^t v dt = \int_o^t \frac{1}{mg} f dt.$$

If $m$ and $g$ are constant, then this equals $1/mg \times$ total number of cycles since time zero. Thus, by counting the number of cycles of the signal, the displacement of the system relative to the ground can be measured.

Figure 2:
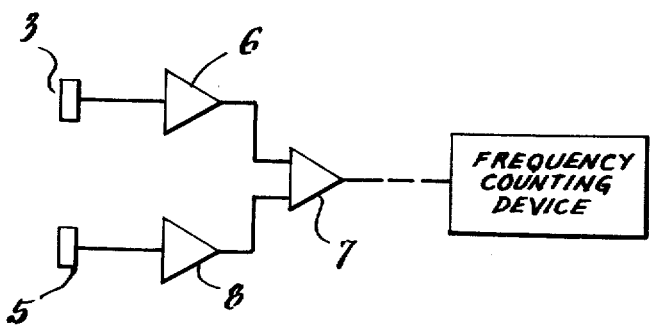
FIG. 2 is a schematic circuit diagram of electrical equipment for use with the system of FIG. 1.

The signals from the photodiodes 3 and 5 will in practice generally include, together with the frequency component indicative of displacement as explained above, a lower frequency component due to large scale luminous intensity variations of the ground. However, the higher frequency component carried by the signals from the photodiodes 3 and 5 will be out of phase relationship due to the grating arrangement 1 whereby the photodiode 3 receives light signals from the spaced bands 2 whilst the photodiode 5 receives light signals from the spaced bands 4. In other words, there will effectively be a half-wave phase shift between the respective signals from the photodiodes 3 and 5. Thus, by appropriate comparison of the electrical signals emitted from the photodiodes 3 and 5, the unwanted lower frequency component can effectively be eliminated (although some modulation may remain) and the higher frequency component retained. Such comparison of the signals can be achieved by means of electrical devices arranged as schematically shown in FIG. 2.

The electrical signal emitted by the photodiode 3 passes through an amplifier 6 to a differential amplifier 7. The electrical signal emitted by the photodiode 5 similarly passes through an amplifier 8 to the differential amplifier 7. The differential amplifier 7 emits an output signal representative of the difference between the signals from the amplifiers 6 and 8, this output signal thus having a frequency representative of the speed or movement of the grating arrangement 1 relative to the ground, the lower frequency component having been eliminated (except as a modulation). The output signal from the differential amplifier 7 can then be applied in any suitable manner, such as to a conventional frequency counter with appropriate scaling factor to indicate the displacement of the grating arrangement relative to the ground, and for example to indicate the velocity of travel relative to the ground and/or to indicate the distance travelled from a given zero position.

Figure 3:
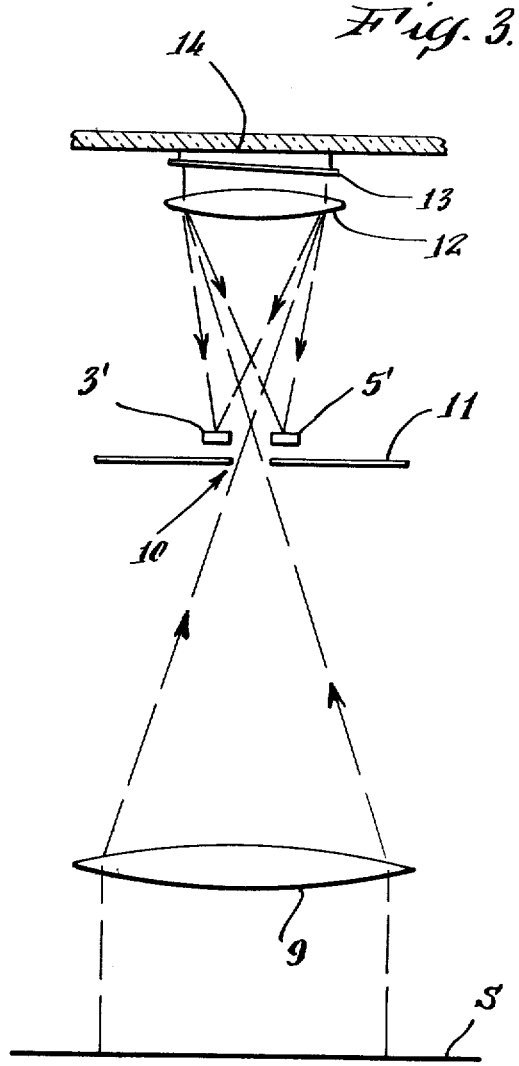
FIG. 3 is a schematic representation of another embodiment.

FIG. 3 schematically shows another embodiment of the invention in which the grating and light directing means is provided by a grating having reflective and transmissive bands arranged in alternation backed by a mirror. In this embodiment light from the surface S is focussed or collected by an objective lens 9 onto an aperture 10 provided in a plate 11, the aperture 10 providing the stop of the system. The light passing through the aperture 10 travels through a lens 12 to a grating 13. The grating 13 has parallel reflective and transmissive bands arranged in alternation, the bands running parallel to the plane of FIG. 3. Behind the grating 13 is a plane mirror 14. In this embodiment, photodetectors 3' and 5' are located just behind the aperture plate 11 and disposed one to each side of the aperture 10.

The grating 13 and the mirror 14 are inclined relative to each other and to the optical axis of the system so that light reflected from the reflective bands of the grating 13 is directed in a first general direction towards the photodetector 3', the light being focussed or collected on to this photodetector by the action of the lens 12. Light passing through the transmissive bands of the grating 13 is received on the mirror 14 and is reflected thereby back through the transmissive bands of the grating 13 in a second general direction towards the photodetector 5', the light also being focussed or collected onto this photodetector by the action of the lens 12.

The system travels relative to the surface S (or the surface travels relative to the system) in a direction perpendicular to the plane of FIG. 3 (ie. perpendicular to the bands of the grating 13). The photodetectors 3' and 5' therefore receive separate light signals and emit electrical signals representative of the received light signals as previously described. The emitted electrical signals can be compared by an arrangement as previously described with reference to FIG. 2.

The grating 13 and mirror 14 may be provided on different faces of a single component such as a wedge-shaped glass element having the grating on the front face and having the back face, which is inclined to the front face, coated to provide the mirror.

Figure 4:
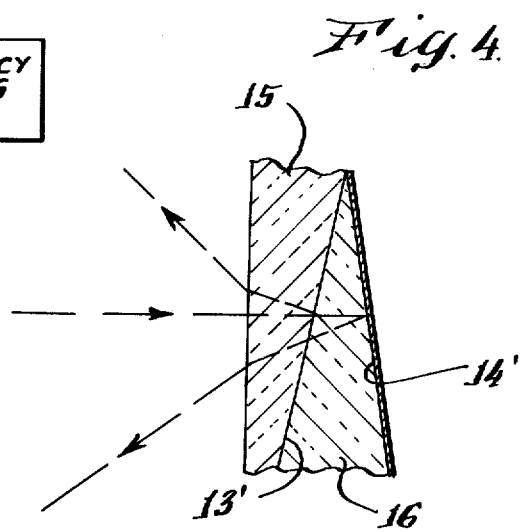
FIG. 4 is a schematic representation of a component which may be used in the embodiment of FIG. 3.

Further, as illustrated in FIG. 4, one wedge-shaped glass element 14 may be cemented to another wedge-shaped glass element 15 with the grating 13' being at the interface between the elements. A mirror 14' is provided by a reflective coating on the rear face of the glass element 16. The glass element 15 in front of the grating 13' then has a compensating effect on the light paths.

Figure 5:
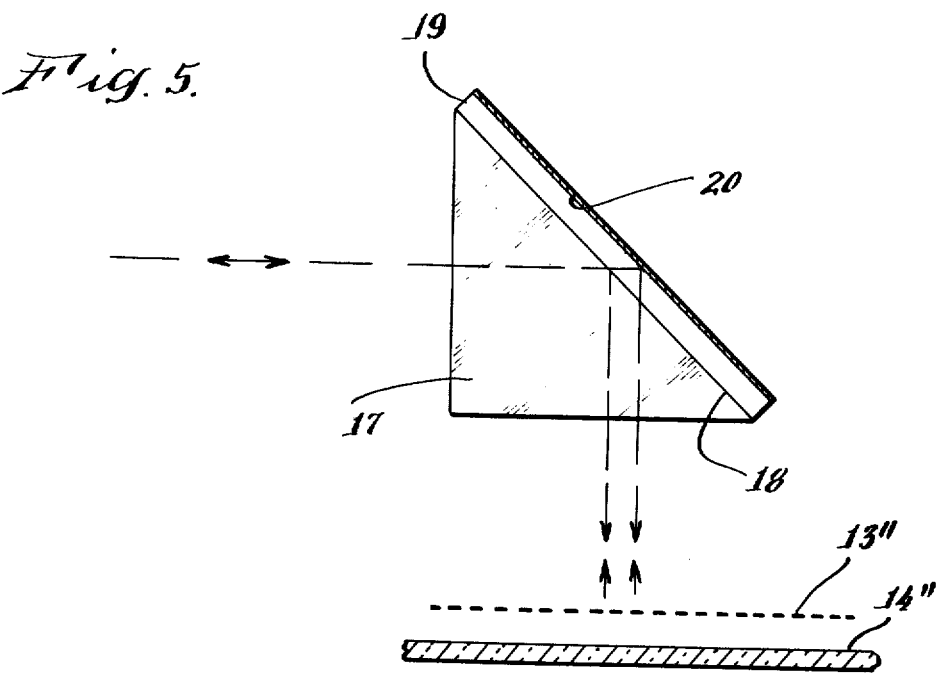
FIG. 5 is a schematic representation of a modification to the embodiment of FIG. 3, and FIGS. 6 and 7 are schematic representations of other grating arrangements.

FIG. 5 illustrates a further modification of the FIG. 3 embodiment wherein the light may be directed towards a grating 13'' and a mirror 14'' by a prism element 17. The bands of the grating 13'' run perpendicular to the plane of the figure. The prism element 17 has a face 18 providing a polarizing beam splitter such that light polarized in one plane is reflected by the face 18 towards the grating 13'' and mirror 14'' while light polarized in the orthogonal plane is transmitted through the face 18. A glass slab or plate 19 is cemented to the prism face 18 and has its rear face 20 aluminized to be reflective. Light transmitted through the prism face 18 is reflected by the face 20 towards the grating 13'' and mirror 14''. Thus, by this arrangement an incident light ray is effectively split into two spaced rays of different polarizations which travel towards the grating 13''. Such rays reflected from the reflective bands of the grating 13'' are returned towards the prism 17 and by reflection from the respective faces 18 and 20 are directed towards a polarization selective beam splitter which separates the light by its polarization into two separate light signals which are received on respective photodetectors. In similar fashion, the light rays transmitted through the transmissive bands of the grating 13'' and reflected by the backing mirror 14'' are returned towards the prism 17 and by reflection from the respective faces 18 and 20 are directed towards a polarization selective beam splitter which separates the light by its polarization into two separate light signals which are received on respective photodetectors. Owing to the relative inclination between the grating 13'' and mirror 14'', the light reflected from the reflective bands of the grating is directed in a different general direction from that reflected from the mirror 14'' as previously explained. The thickness of the plate 19 is such as to give a shift between the rays incident on the grating 13'' and mirror 14'' of one quarter cycle or 90° (with respect to the band spacing of the grating). Thus, with this arrangement the separate light signals achieved by reflection respectively from the reflective bands of the grating and from the mirror, which signals are at half cycle or 180° spacing, are each effectively further split into separate light signals at quarter cycle or 90° spacing. The provision of quarter cycle or 90° spaced signals can be of assistance in relation to the achievement of direction measurement.

Although in the embodiment described above the grating and light directing means operate to deviate light from the surface by reflection, it will be appreciated that the system in accordance with the invention could also operate utilizing light transmitted through the grating and light directing means. For example, the grating and light directing means could comprise a series of bands which act to deviate the incident light by refraction. The bands may comprise wedges tapering in opposite directions arranged in alternation (the wedge slope being either parallel to or perpendicular to the bands) so that the set of wedge bands tapering in one direction deviate the incident light transmitted therethrough by refraction to direct it in a first general direction, and the set of wedge bands tapering in the opposite direction deviate the incident light transmitted therethrough by refraction to direct it in a second general direction. The light so deviated can then be focussed or collected by an appropriate lens, e.g. located adjacent the wedge grating arrangement, on to respective photodetectors appropriately located at spaced positions.

Figure 6:
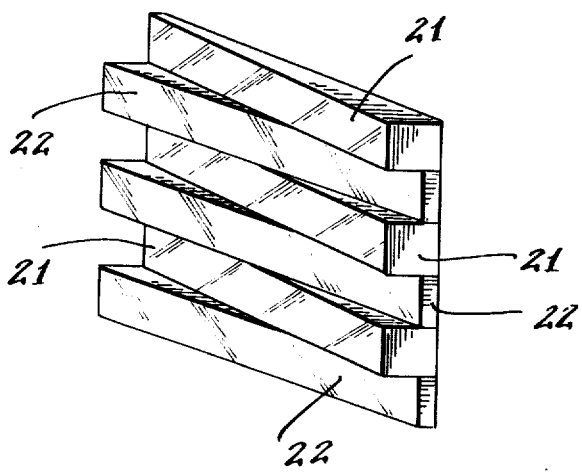
Figure 7:
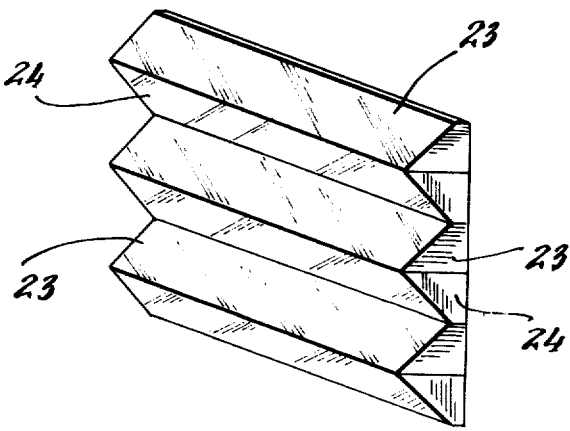

Examples of such wedge grating arrangements are shown in FIGS. 6 and 7. FIG. 6 shows wedge elements 21 and 22 arranged in alternation to provide the bands, the wedges 21 and 22 tapering in opposite directions with the direction of taper parallel to the bands. FIG. 7 shows wedge elements 23 and 24 arranged in alternation and providing the bands, the wedges 23 and 24 tapering in opposite directions with the direction of taper perpendicular to the bands.

It will be seen that light incident on the wedge elements 21 in FIG. 6 will be deviated by refraction as it is transmitted therethrough to travel in one general direction while light incident on the wedge elements 22 will be deviated by refraction as it is transmitted therethrough to travel in a second general direction. Similarly in the FIG. 7 arrangement light transmitted through the wedge elements 23 will be deviated by refraction to travel in a first general direction while light transmitted through the wedge elements 24 will be deviated by refraction to travel in a second general direction.

It will be seen that a system in accordance with the invention can be incorporated in a self-contained unit which can readily be fitted to a vehicle such as, by way of example, a wheeled vehicle or a tracked vehicle or a hovercraft. It will further be seen that the system can be used to measure actual displacement, i.e. distance, or to measure velocity, i.e. displacement per unit time, and the invention is therefore particularly suitable for use as an odometer or a speedometer.

It will further be understood that a system in accordance with the invention can be used to measure displacement or speed of a moving surface, the system being stationary and the surface moving past the system. Further, of course, the system could be used to measure relative displacement or velocity where both the system and the surface are in fact in motion. Yet further it will be appreciated that two systems could be arranged effectively in orthogonal directions to measure respective orthogonal velocity components.

What is claimed is:

1. Apparatus for measuring displacement or velocity relative to a surface above which said apparatus is independently supported for travel relative to the surface said apparatus comprising grating and light directing means having several pairs of light reflecting means with the light reflecting means of the several pairs being arranged in alternation and with the light reflecting means in each pair being adapted to reflect incident light received from the surface in two different general directions, respectively, thereby to provide separate light signals representative of luminous intensity variations of the surface relative to which the apparatus travels, and means effective to compare said separate light signals and provide an output signal derived from the difference therebetween.

2. Apparatus according to claim 1 wherein the grating and light directing means comprise a first series of spaced concave reflective bands having a common centre of curvature, and a second series of spaced concave reflective bands interposed between and in alternation with the bands of the first series and having a common centre of curvature spaced from the centre of curvature of the first series.

3. Apparatus according to claim 1 wherein the grating and light directing means comprise a grating having reflective and transmissive bands arranged in alternation backed by a mirror, the grating and the mirror being relatively inclined so that light reflected by the reflective bands of the grating is directed in a first general direction and light transmitted through the transmissive bands of the grating is reflected by the mirror backing the grating to be directed in a second general direction.

4. Apparatus according to claim 3 wherein the grating and the mirror are so disposed that light transmitted through the transmissive bands of the grating is reflected by the mirror back through the transmissive bands of the grating.

5. Apparatus according to claim 3 comprising a lens disposed in front of the grating to focus or collect light directed in said two general directions on to respective photodetector means.

6. Apparatus according to claim 3 comprising means providing an aperture through which light from said surface passes to said grating and light directing means, and an objective lens to focus or collect light received from the surface onto the aperture.

* * * * *